United States Patent
Hampp (12)

(10) Patent No.: US 6,366,388 B1
(45) Date of Patent: Apr. 2, 2002

(54) LIGHT MODULATOR COMPRISING A PHOTOCHROMIC LAYER

(76) Inventor: Norbert Hampp, Schillerstrasse 10, 35287 Amöneburg-Rossdorf (DE)

( * ) Notice: Subject to any disclaimer, the term of this patent is extended or adjusted under 35 U.S.C. 154(b) by 0 days.

(21) Appl. No.: 09/720,829
(22) PCT Filed: Jul. 15, 1999
(86) PCT No.: PCT/EP99/05062
  § 371 Date: Jan. 16, 2001
  § 102(e) Date: Jan. 16, 2001
(87) PCT Pub. No.: WO00/04415
  PCT Pub. Date: Jan. 27, 2000

(30) Foreign Application Priority Data

Jul. 15, 1998 (DE) .......................... 198 31 777

(51) Int. Cl.[7] ............ G02F 1/03; G02F 1/153; G02B 5/23
(52) U.S. Cl. .............. 359/241; 359/275; 252/586; 544/69
(58) Field of Search ............ 359/240, 241, 359/242, 243, 244, 273, 275, 288, 289, 588, 589; 252/582, 586; 544/69

(56) References Cited

U.S. PATENT DOCUMENTS 5,148,335 A * 9/1992 Kudo et al. ............. 369/59.11

FOREIGN PATENT DOCUMENTS

JP 2-46442 * 2/1990
JP 3-192549 * 8/1991

* cited by examiner

Primary Examiner—Georgia Epps
Assistant Examiner—William Choi
(74) Attorney, Agent, or Firm—Arent Fox Kintner Plotkin & Kahn (57) ABSTRACT

A light modulator (1) is proposed which has a photochromic layer (15), which can be activated optically by control light, for modulating signal light, and at least one optically transparent substrate (13) for the photochromic layer (15), in which the light modulator (1) has at least one filter layer (14), which reflects the control light in a wavelength-selective fashion for the purpose of retroreflecting control light which has penetrated the photochromic layer (15). The reflecting filter layer (14) ensures that the control light is utilized efficiently for the photochemical conversion (photoconversion) of the photochromic material, since the control light passes twice through the photochromic layer (15). The reflecting filter layer (14) has the function, furthermore, of separating the control light from the modulated signal light such that the modulated signal light can be evaluated without significant interference from the control light.

13 Claims, 3 Drawing Sheets

LIGHT MODULATOR COMPRISING A PHOTOCHROMIC LAYER

DESCRIPTION

The invention relates to a light modulator having a photochromic layer, which can be activated optically by control light, for modulating signal light, and at least one optically transparent substrate for the photochromic layer.

BACKGROUND OF THE INVENTION

Light modulators of the aforementioned type are also denoted as optically addressable, spatial light modulators. Although the photochromic layer is "addressed" optically only two-dimensionally and not three-dimensionally, it is usual to talk of a spatial light modulator instead of a planar one. Such light modulators are denoted below as OASLMs.

The photochromic layer serves the purpose of transmitting or conveying information from the control light to the signal light. In the event of irradiation with control light of a predetermined first optical wavelength, the photochromic layer reacts at the site of irradiation with a change in specific optical properties—in particular with a change in the optical absorptivity—for signal light of a predetermined second optical wavelength. For example, the control light can be used to project an intensity contrast image onto the photochromic layer, which then reacts with a setting, corresponding to the contrast image, of its absorptivity as regards the signal light beyond the area irradiated by the control light. If the photochromic layer thus activated optically by control light is irradiated with signal light, the signal light emerging from the photochromic layer has a modulation corresponding to the absorption contrast pattern. Information from the control light can therefore be transmitted onto the signal light in a planar fashion in a way which varies with time. The signal light striking the photochromic layer can be an extended light bundle which simultaneously covers the entire light entry area of the photochromic layer. A corresponding statement holds for the control light. However, it is also possible to "write" the relevant information into the photochromic layer with the aid of a deflectable control light beam. Likewise, it is also possible for the purpose of "reading" or "erasing" the information to make use of a signal light beam or "erasing light beam" which, for example, scans the photochromic layer by row or by column.

A multiplicity of photochromic materials come into consideration for such applications. An overview of the essential photochromic material classes, their best known representatives and their properties is to be found in H. Dürr, H. Bouas-Laurent, "Photochromism—Molecules and Systems", Studies in Organic Chemistry, Elsevier, Vol. 40, 1990. In addition to other photochromic materials such as, for example, synthetic inorganic and organic photochromics, bacteriorhodopsin in the form of a-purple membrane, denoted below as BR, is a particularly interesting material for forming the photochromic layer. Purple membrane is the form used for the naturally occurring two-dimensional crystalline form of bacteriorhodopsin. The design of the so-called purple membrane from lipids and bacteriorhodopsin is described in numerous examples in the literature. D. Oesterhelt et al., Quart. Rev. Biophys., 24 (1991) 425–478 may be cited by way of example as a reference.

It is, inter alia, the following five reasons which render bacteriorhodopsin particularly suitable for the application outlined.

(i) BR is distinguished by a very efficient photochemical reaction with several photoactive states which render it possible to implement "writing" and "erasing" photochemically.

(ii) BR has a particularly high reversibility, and this predisposes it to dynamic use.

(iii) The specific absorptions of the long lived states of BR, and also the difference in refractive index between these states are very high, and so good modulation of the signal light is achieved.

(iv) Bacteriorhodopsin has a strongly anisotropic chromophore and is therefore suitable for polarization-selective modulation.

(v) Apart from the wild type of BR, there is currently available a whole series of variants of BR produced using gene technology and having altered amino acid sequences and/or variants, which contain as chromophores molecules differing chemically from retinylidene radical and have other spectral and/or other photokinetic properties than the wild type, for example different absorption properties and/or substantially longer lived photointermediates.

The material group specified in (v) is denoted below as BR variants. The term bacteriorhodopsin or BR is used in such a way that either the wild type of bacteriorhodopsin or one of the BR variants is understood thereby. Furthermore, the term bacteriorhodopsin or BR is used both for monomeric BR and for BR in the form of purple membranes. BR variants may be obtained with various methods. An overview of known methods for producing mutated bacteriorhodopsins and BR analogs, which are typified by the presence of chromophore groups differing from the retinylidene radical occurring in the wild type, is given in N. Vsevolodov, "Biomolecular electronics—an introduction via photosensitive proteins" (1988), Birkhaüser, Boston, Chapter 3. Typical BR variants of technical interest which are obtained by modifying the amino acid composition of wild type BR are those with a lengthened lifetime of the so-called M state, for example those in which the aspartic acid at position 96 has been replaced or removed or displaced in its position by removal of other amino acids, or those with a high probability of the formation of 9-cis-retinal, for example those in which the aspartic acid at position 85 has been replaced or removed or displaced in its position by removal of other amino acids. Typical technically interesting BR variants which are produced by replacing the retinylidene radical occurring in wild type BR by analog molecules are, for example, 4-ketoretinal and dihydroretinal (Sheves et al., Biochem., 24, 1985, 1260–1265). It may be pointed out expressly that a combination of modifications of the amino acid composition and replacement of the chromophore group is also understood by the term BR variants.

Said possibilities and properties of BR are known to the person skilled in the art and have also influenced applications of BR in various optical information processing techniques.

The optically active component is formed by the BR layer in OASLMs. The optical modulation is based on the fact that bacteriorhodopsin can be converted from the initial state B (maximum absorption at approximately 570 nm) by irradiation of light of wavelength $\lambda_B$ into at least one other spectrally different state. The longest lived state of the photocycle of wild type BR is usually denoted as M state (maximum absorption at approximately 410 nm). Light of wavelength $\lambda_M$ can be used to convert said state photochemically into the initial state B. Consequently, light in the wavelength region of $\lambda_B$ can be varied and/or controlled, or else vice versa by simultaneous illumination of the BR layer with light in the wavelength region of $\lambda_M$, using the BR layer as a mediator.

The degree of modulation depends in this case on the magnitude of the photochromic optical absorption changes which is caused by the irradiation of light in the BR layer, on the quantum yield of the phototransformations B↔M and the intensities and wavelengths of the two optical irradiations. Because of the polarization-sensitive photoreaction of the BR, the relative position of the polarization states of the two wavelengths or wavelength regions likewise plays a role in the level of the modulation. Furthermore, the local refraction index, which can likewise be used for modulation purposes, is modulated in a manner proportional to the absorption modulation.

OASLMs have been known for a long time as active optical components in beam paths for the purpose of optical processing of images and information, and are used to control and/or to modulate the amplitude, the phase and, if appropriate, also the polarization of a spatially extended lightwave field as a function of the intensity of a control light source.

An overview of the state of knowledge concerning BR, and the possibility of applying BR in optical information processing can be gathered, inter alia, from the articles by D. Oesterhelt et al., Quart. Rev. Biophys., 24 (1991) 425–478, D. Zeisel and N. Hampp, J. Phys. Chem., 96 (1992) 7788–7792, N. Hampp et al., Proc. SPIE—Int. Soc. Opt. Eng., 1732 (1993) 260–270 and N. Vsevolodov, "Biomolecular electronics—an introduction via photosensitive proteins" (1998), Birkhaüser, Boston.

The use of a spatial light modulator in a beam path for the purpose of holographic writing and reading of optical data which are stored in a BR layer is described in R. R. Birge et al., Ann. Int. Conf. IEEE Eng. Med. Biol. Soc. 12 No. 4, (1990), 1788–1789.

A spatial light modulator which is based on a BR layer and has been used as a spatial frequency filter for optical image correction, in particular for optical edge reinforcement is likewise described in the article by R. Thoma et al., Opt. Lett. 16 (1991) 651–653.

A specific spatial light- modulator based on a Perot-Fabry resonator, which contains a BR layer as active element, is described in U.S. Pat. No. 5,618,654.

The known light modulator has two plane-parallel, semi-transparent mirrors situated opposite and parallel to one another. With the given mirror spacing L and refractive index n of the medium between the mirrors, the Fabry-Perot interferometer corresponding to the resonance condition L=N $\lambda_{ir}$/2 n is virtually completely transparent to light of wavelength $\lambda_{ir}$ although, viewed individually, the mirrors must have a high reflectivity to light of the resonance wavelength $\lambda_{ir}$. In the case of the subject matter of U.S. Pat. No. 5,618,654, the refractive index of the photochromic layer between the resonator mirrors is varied by irradiation with control light of wavelength $\lambda_v$ in order optionally to fulfill the resonance condition for signal light of wavelength $\lambda_{ir}$. In this way, the transmittivity of the interoferometer light modulator is varied overall for the signal light $\lambda_{ir}$, and thus the signal light is modulated. In order to enable the control light required for changing the refractive index to reach the photochromic layer, in order to function the known modulator requires the resonator mirrors to be transparent to the control light with as high as possible a transmittivity, and therefore to have as small a reflectivity as possible, whereas the reflectivity of the respective resonator mirrors to signal light must be as high as possible in accordance with the functional principle of the Fabry-Perot interferometer.

Further examples of light modulators which function using the principle of the Fabry-Perot interferometer are described in DE-A 19 35 881 and U.S. Pat. No. 4,834,511. In order to function, all these light modulators using the principle of the Fabry-Perot interferometer require precise observation of the geometrical relationships, in particular the spacing between the resonator mirrors, set to fulfill the resonance condition. Maintaining the mirrors in a mutually parallel position, and avoiding fluctuations in the spacing between the mirrors over the entire modulator area also causes problems. The previously mentioned geometrical conditions which must necessarily be observed in the known light modulators usually require a vibrationless and thermostatic design in the case of light modulators using the interferrometer principle.

Further details on light modulators employing a BR layer follow from the papers by R. B. Gross et al., Proc. SPIE-Int. Soc. Opt. Eng. 1662 (1992) 186–196 and Q. W. Song et al., Opt. Lett. 18 (1994) 1373–1375, and also H. Takei and N. Shimizu, Opt. Lett. 19 (1994), 248–250.

SUMMARY OF THE INVENTION

The invention is based on the object of developing an integrated optical component which is based on an optically addressable, spatial light modulator with improved application properties and which can be used in a versatile fashion as an active switching and/or control element in beam paths for the purpose of optical imaging, in optical display systems, in optical systems for information storage and processing, and also in holographic measuring and processing systems.

Starting from a light modulator of the type mentioned at the beginning, this object is achieved-according to the invention by virtue of the fact that the light modulator has at least one filter layer, which reflects the control light in a wavelength-selective fashion, for the purpose of retroreflecting control light which has penetrated the photochromic layer the reflecting filter layer having a reflectivity of at least 80% as regards the control light.

The control light can reach the photochromic layer from a control light entry side of the light modulator, and penetrate into the photochromic layer. The reflecting filter layer is located on the side of the photochromic layer averted from the control light entry side, and ensures that the control light is retroreflected again to the photochromic layer. As a result, the control light is utilized substantially more effectively for the photochemical conversion (photoconversion) of the photochromic material, since the control light passes twice through the photochromic layer, and the control light path in the photochromic layer is thereby doubled. In this way, the intensity-dependent degree of modulation of the photochromic layer is substantially improved. This leads to economic advantages, since it is possible to use control light sources which are of lower power and thus more cost-effective. This holds, in particular, for lasers as control light sources. Alternatively, there is a reduction in the need for BR quantity per area of the OASLM in order to achieve a prescribed degree of modulation for a given control light source. This yields economic advantages, since, in particular, genetically altered bacteriorhodopsins are expensive.

The reflecting filter layer does not, however, have only the function of efficiently utilizing the control light for optical activation of the photochromic layer, but also the function of largely separating the control light from the modulated signal light, doing so by passing the signal light modulated at the photochromic layer toward a light exit side of the light modulator, and reflecting the control light in the opposite direction as determined by the reflectivity. The modulated signal light can therefore be utilized by the control light without appreciable interference. This point of view is of particular significance if a comparatively intensive laser beam is used as control light beam to "describe" the photochromic layer and visual observation of the photochromic layer is intended to be performed from the signal light exit side of the light modulator, or when a light-sensitive medium, for example a photosensitive layer, is situated in the signal light beam path downstream of the light modulator.

The light modulator according to the invention has considerable advantages by contrast with the known light modulators already addressed above, which function using the principle of the Fabry-Perot interferometer and have mirrors with as small as possible a reflectivity for the control light. These advantages include a simple design which is comparatively uncritical with regard to the dimensions of layers and spacings between the filter layers. Thermostating measures are not required with the light modulator according to the invention, since linear expansion effects do not appreciably affect the functioning of the modulator, and so the functioning of the light modulator according to the invention is not impaired by normal temperature fluctuations. Since the thickness of the photochromic layer can to a large extent be selected freely in the case of the light modulator according to the invention, the production engineering requirements placed on the observation of tolerances etc., are also slight. The greater degrees of freedom with regard to any possible fluctuations in the thickness of the layers of the light modulator according to the invention facilitate the implementation of relatively large light modulator areas.

Again, it is possible to operate with polychromic signal light in the case of the subject matter of the present invention.

The filter layer reflecting the control light is preferably arranged between the photochromic layer and the substrate, being in direct contact with the photochromic layer. The fact that the photochromic layer and reflecting filter layer are directly coupled prevents a substantial beam offset which would reduce the useful resolution of the OASLM. Thus, direct coupling of photochromic layer and reflecting layer economizes on optical components, and this leads to economic advantages and minimizes the overall size of the system.

Furthermore, because the interfering control light is removed immediately downstream of the photochromic layer, the control light component in the downstream signal light beam path can be substantially reduced, and so the signal-noise ratio can be improved. An additional improvement in the signal-noise ratio results from the fact that the number of the internal interfaces, and thus the reflection losses are reduced.

The reflecting filter layer preferably has a reflectivity of at least 99% for the wavelength of maximum reflectivity, and so it is possible to separate the control light from the modulated signal light virtually completely.

The photochromic layer -preferably contains bacteriorhodopsin as active component.

It is particularly preferred for the photochromic layer to contain a variant of the wild form of the bacteriorhodopsin, which has a higher light sensitivity and/or a longer service life of the longest lived intermediates than the wild form, and specifically in particular a variant in the case of which the amino acid position 85 is modified, or a variant in the case of which the amino acid position 96 is modified, or a variant in the case of which dihydroretinal or 4-ketoretinal serves as chromophore group, or a variant in the case of which both dihydroretinal or 4-ketoretinal serve as chromophore group and the amino acid position 85 and/or 96 are modified.

The OASLM according to the invention can, in particular, have on at least one side an antireflection layer effective over a wide band of visible light.

Furthermore, it can be expedient to apply a protective layer transparent to visible light at least to the side of the photochromic layer averted from the substrate.

In accordance with a development of the invention, it is possible to provide a second wavelength-selectively reflecting layer with a wavelength-selective reflectivity differing from the first reflecting filter layer. Essentially the same result can also be achieved with a coating when the latter has two or, possibly, even more wavelength regions in which there is a pronounced selective reflection.

In accordance with a particularly preferred development of the invention, on the side of the photochromic layer averted from the reflecting filter layer a filter layer which reflects the signal light in a wavelength-selective fashion the light modulator has and retroreflects signal light which has penetrated the photochromic layer. Such a light modulator having a respective reflection filter on mutually opposite sides of the photochromic layer constitutes an optical component which is suitable for interesting applications such as, for example, for the incoherent/coherent conversion still to be described below, or for the frequency conversion likewise still to be explained.

For various applications, interest may attach to a light modulator of the type mentioned in the beginning which has only one filter layer reflecting the signal light in a wavelength-selective fashion in order to retroreflect signal light which has penetrated the photochromic layer. Such a light modulator therefore outputs the modulated signal light to that side at which the unmodulated signal light has entered the light modulator.

The invention also relates to an optical display device having a light modulator as claimed in one of claims 1–6 as display element. The optical display device comprises a control light source for activating the photochromic layer of the light modulator with the aid of control light in accordance with the information respectively to be displayed, and a signal light source for providing the signal light which is to be modulated by the light modulator in order to visualize the information to be displayed, the light modulator being arranged in the control light beam path and in the signal light beam path in such a way that the control light and the signal light enter the photochromic layer on the side of the photochromic layer averted from the reflecting filter layer, the modulated signal light being capable of emerging on the side of the light modulator opposite the light entry side. The visual observation of the displayed information or the modulated signal light is performed from the side of the light modulator averted from the light entry side. The information displayed can be a contrast image of an object mask arranged in the control light beam path which is projected onto the photochromic layer of the light modulator.

In accordance with a preferred variant of the optical display device, the control light source is a laser, a deflecting device, in particular a biaxial scanner, being provided for the controlled deflection of the control light beam, for the purpose of planar addressing, and an intensity modulator being provided which controls the intensity of the control light beam as a function of its impingement position on the photochromic layer in accordance- with the information to be displayed.

The laser can preferably be switched between two wavelengths $\lambda_S$ and $\lambda_L$ which are selected such that the photochromic layer can be written with light of wavelength $\lambda_S$ and can be erased with light of wavelength $\lambda_L$. In this context, writing the photochromic layer means that the photochromic layer is activated in order to change its optical properties for the signal light. Erasing the photochromic layer means in this context that the photochromic layer is returned to its original state again.

The invention also relates to an optical arrangement having a control light source, a signal light source and a light modulator as claimed in claim 7 for the purpose of transmitting information contained in a control light beam onto a signal light beam, in which the control light beam carrying the respective information enters the photochromic layer from the side of the photochromic layer of the light modulator averted from the filter layer reflecting the control light in a wavelength-selective fashion, and the signal light beam enters the photochromic layer from the side of the photochromic layer averted from the filter layer reflecting the signal light in a wavelength-selective fashion.

Such an optical arrangement can be used as an incoherent/coherent converter when the control light is incoherent and the signal light is coherent. The information contained in the incoherent control light beam can be transmitted in such an arrangement onto the coherent signal light beam. The information to be transmitted can be, for example, the image of an object mask located in the control light beam path, which image is projected onto the photochromic layer of the light modulator.

A further possibility of use for the above-named optical arrangement relates to the transmission of the object information contained in a control light beam with the wavelength $\lambda_1$ onto a signal light beam with the wavelength $\lambda_2$. In this case, the control light source is a laser with the wavelength $\lambda_1$, and the signal light source a laser with the wavelength $\lambda_2$.

Preferred applications of the invention are:
(i) high-resolution optical display systems which can be viewed with a naked eye from the light exit side of an OASLM for the modulated signal light without running the risk of being dazzled and/or injured by the intense laser light which is used as control light,
(ii) projection displays for high-resolution data projection,
(iii) incoherent/coherent converters for various optical systems, and
(iv) variable masks for the exposure of light-sensitive layers in photolithography.

BRIEF DESCRIPTION OF THE DRAWINGS

Exemplary embodiments of the invention are explained below with reference to the figures, in which.

DESCRIPTION OF THE PREFERRED EMBODIMENT(S)

Figure 1:
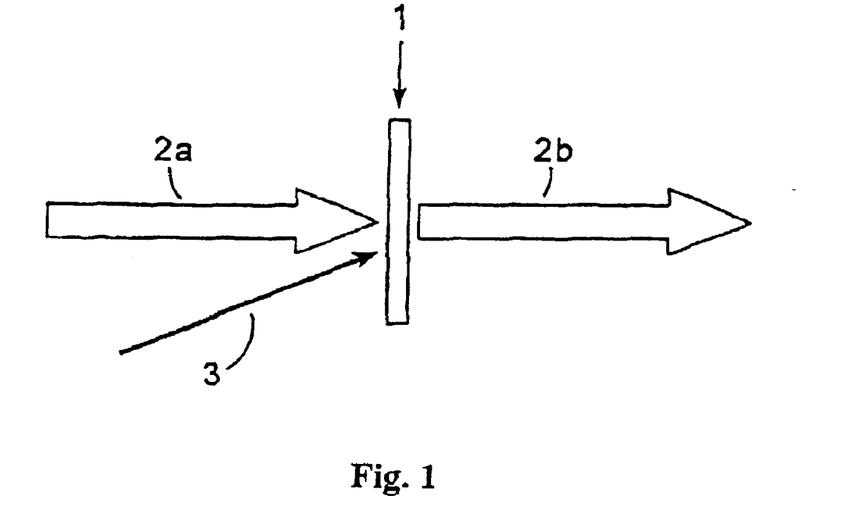
FIG. 1 shows a possible configuration of a beam path for the use of an optically addressable spatial light modulator having signal light, or primary light, and control light, or secondary light.

Illustrated in FIG. 1 is an optically addressable light modulator 1, denoted below as OASLM, which is struck by unmodulated signal light 2a. The optical properties of the photochromic layer of the OASLM 1, for example the absorption and reflectivity, or the refractive index, are modulated spatially by the control light 3. This spatial modulation of the optical properties leads to a corresponding modulation of the signal light 2a as it passes through the photochromic layer, as a result of which the signal light 2b emerging from the OASLM 1 is correspondingly modulated. In the example in accordance with FIG. 1, the control light 3a strikes the OASLM 1 from the same side as does the unmodulated signal light 2a. It is also possible to make simultaneous use of several control light sources (multiple modulation). Moreover, a further light source can be added for the purpose of photochemical erasure of the OASLM.

Figure 2:
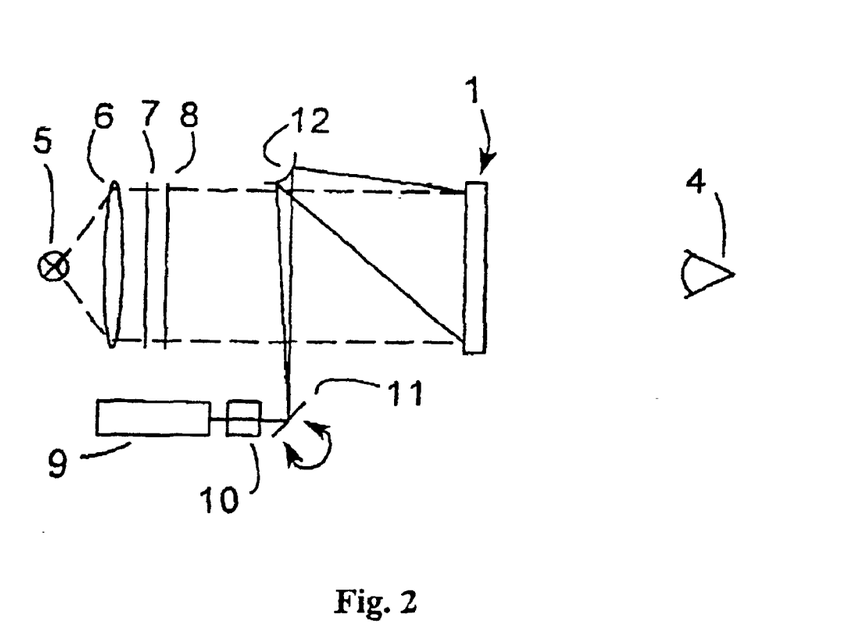
FIG. 2 shows a beam path in which the light modulator functions as a visual display element.
Figure 3:
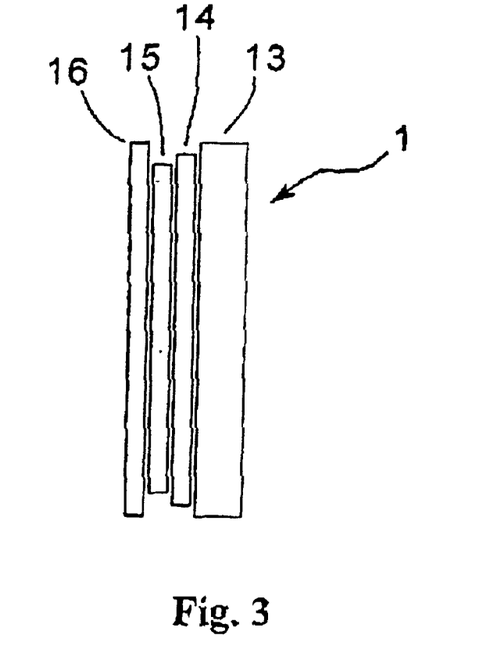
FIG. 3 shows the basic components of the light modulator used in the arrangement of FIG. 2.

FIG. 2 illustrates an example of application for an OASLM 1 according to the invention which is shown in FIG. 3 and explained in further detail below. FIG. 2 is a schematic of a high-resolution display system in which the OASLM 1 forms a display element to be viewed with the naked eye 4. The OASLM 1, which contains bacteriorhodopsin, is illuminated with unmodulated signal light which emerges from the halogen lamp 5 as light source and passes through the condenser 6, the color filter 7 and a diffuser 8. The control light is directed onto the OASLM 1 from a laser 9 via an optical system comprising a fast intensity modulator 10, a biaxial mirror scanner 11 and a suitable deflecting mirror 12, this being done, specifically, from the same side as the signal light. In order to implement a large deflection angle for the control light beam it is possible to provide as a further component a so-called f-theta lens (not -shown) in the arrangement according to FIG. 2. The purpose of the intensity modulator is to control the control light intensity as a function of the respective location of the control light beam on the OASLM 1 as determined by the desired display, a control device (not shown) controlling the mirror scanner 11 in order to move the control light beam and the intensity modulator 10 to set the control light intensity in each case. The mirror scanner 11 is preferably controlled such that the control light beam-scans the OASLM with a specific repetition rate, doing so by row or by column over the entire lateral surface of the OASLM, in order to "write" the information to be displayed to the photochromic layer (rasterized control). Alternatively, the mirror scanner 11 can be controlled such that the control light beam in each case draws only the track of the information to be displayed onto the photochromic layer (vector control). The spectrum of the signal light irradiated into the OASLM 1 comprises a wavelength region which corresponds to the spectral region in which the absorption behavior of the OASLM 1 can be influenced by the control light. Thus, in accordance with the photochemical properties of the BR material, the control light leads to a change or setting of the absorption behavior of the photochromic layer as determined by the intensity pattern of the control light, and thus to a corresponding modulation of the signal light which strikes an observer 4. It is also possible at 4 in FIG. 2, for example, to provide a photodetector, a light-sensitive film, applied to a workpiece or the like, for example, in order to evaluate the modulated signal light. A filter layer which retroreflects the control light, after passage through the photochromic layer, in a wavelength-selective fashion ensures that the control light is not passed—or in any event is passed in a strongly attenuated fashion—to the side of the observer 4. In order to remove any possible residual component of control light passed by the OASLM 1, a linear polarization filter can be connected downstream of the OASLM 1 (in crossed position relative to the direction of polarization of the control light, which is linearly polarized in this example).

A preferred application of the invention is therefore a display which can be observed directly with the human eye, can be "written" by a computer-controlled laser scanner with high resolution at repetition rates of a few seconds with the aid of the control light, and in the case of which there is no risk at all of the human observer being dazzled by transmitted laser light (=control light), here a comparatively strong laser, or even of exposing the observer to the risk of damage to his visual apparatus. The laser 9 can preferably be switched back and forth between two wavelengths. The first serves to "write" the OASLM 1, while the second permits specific "erasure" of the OASLM 1. The OASLM is preferably provided with a combination of highly reflecting dielectric layers such that both light of writing wavelength and light of erasing wavelength is transmitted only insubstantially, that is to say by less than 5%. Such a display permits the representation of image information and character information with a resolution which is currently not achieved approximately by classical computer display screens. Typically, the useful resolution of the display according to the invention corresponds to that of laser printers. Fields of application for such high-resolution displays are architecture, medicine, engineering and a multiplicity of other technical areas of application in which data are to be represented and viewed at very high resolution without making a paper printout for these purposes.

The basic components of the OASLM 1 used in the arrangement according to FIG. 2 is illustrated in detail in FIG. 3. A BR layer 15 is applied to a transparent substrate 13 with a wavelength-selectively highly reflecting coating 14 (reflection filter 14) for the wavelength of the control light, if appropriate the wavelength of the writing light and of the erasing light. Such wavelength-selectively highly reflective coated substrates can be produced by means of known deposition methods. Such mirrors are commercially available, for example under the designation of highly reflective laser mirrors, for a range of wavelength regions. The BR layer 15 is provided here with a transparent cover layer 16 which serves the purpose of achieving the necessary optical planeness, of achieving a high scratch resistance, and of encapsulating the BR layer against the environment, that is to say fluctuating relative air humidities etc., and can also be equipped for additional filter functions, if appropriate. The reflectivity of the coating 14 acting as reflection filter is at least 80%, preferably at least 90%, with particular preference at least 99% for one or two selected wavelengths. The spectral bandwidth of the reflection filter is typically 100 nm, preferably at most 70 nm, and with particular preference less than 50 nm for each of the selected wavelengths. The reflective layers are produced in a way known per se by deposition of the substrate with layers of suitable thickness and different refractive indices. If a reflecting layer is provided both for writing light and for erasing light, these can be combined. The substrate 13 consists of a material which does not absorb or absorbs only slightly in the wavelength region of visible light (400–800 nm), for example glass, quartz or transparent plastic. The control light (modulation light) is retroreflected by the reflection filter 14, passes the BR layer 15 for a second time and thereby contributes to improving the modulation. This holds both for the writing operation and for the erasing operation. Furthermore, by comparison with the use of an absorptive filter there is the advantage that no local heat development occurs which would, for example, lead to variations in the refractive index of the surrounding air in the case of a coherent beam path. At the same time, the control light is kept away from the modulated signal beam path downstream of the OASLM 1.

The BR layer 15 in direct contact with the reflection filter 14 can comprise a BR wild type or a BR variant or a mixture of one or more BR variants and, if appropriate, a BR wild type. The BR layer can further contain polymers and other auxiliaries, for example bonding agents, for layer formation and fixing and further auxiliaries or additives for stabilizing the photon availability, the water content, the pH value and for the purpose of adapting the refractive index. The preparation of the BR layer used here is achieved, for example, by distributing an aqueous mixture of 3% gelatin or polyvinyl alcohol and 8% bacteriorhodopsin on the prepared substrate. After vaporization of the water, there remains a film composed of bacteriorhodopsin and the matrix material which has a thickness of less than 1 mm, typically approximately 50 $\mu$m to 250 $\mu$m. The photoproperties of the immobilized BR can be modified by a multiplicity of auxiliaries known in the literature.

Figure 4:
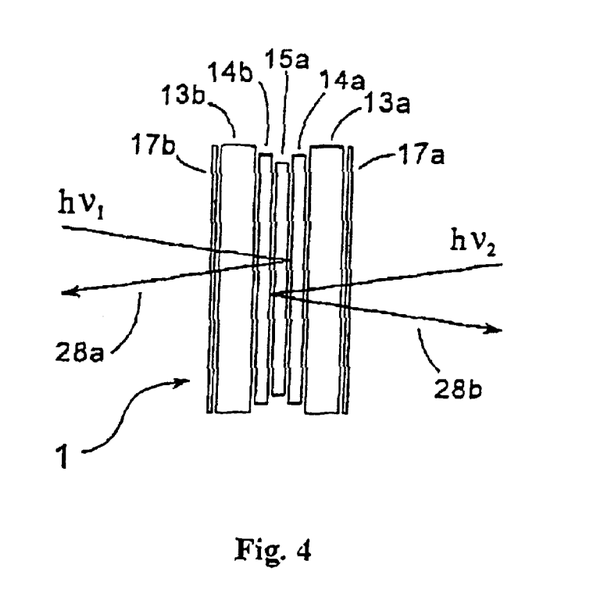
FIG. 4 shows a beam path in which the light modulator functions as an incoherent/coherent converter.

A further preferred exemplary embodiment of an OASLM 1 according to the invention is illustrated in FIG. 4. On the mutually averted sides of the photochromic layer 15a, the OASLM 1 according to FIG. 4 in each case has a wavelength-selectively reflecting filter layer 14a and 14b. The wavelength-selectively reflecting filter layers 14a and 14b have different reflection characteristics, the filter layer 14a being provided for wavelength-selective reflection of the control light 28a, and the filter layer 14b being provided for the wavelength-selective reflection of signal light 28b. The reflecting filter layer 14a is applied to the optically transparent substrate 13a. In a corresponding way, the reflecting filter layer 14b is located on the transparent substrate 13b. The OASLM 1 can optionally have broadband antireflection coatings or wavelength-selective antireflection coatings 17a and 17b on the outsides, in order to reduce reflection losses. The photochromic layer 15a preferably contains bacteriorhodopsin as photochromic material, which can interact both with wavelengths of the control light 28a and with those of the signal light 28b.

Of particular technical interest is the simultaneous application of light of a first wavelength which is preferably absorbed by the B state (for example 568 nm) and light of a second wavelength which is preferably absorbed by the M state (for example 413 nm). Both wavelengths can be generated using krypton gas lasers, for example.

The "air gaps", illustrated in FIGS. 3 and 4, between the elements have been drawn in only for reasons of clarity of representation. They are normally not present in the implemented embodiment.

Figure 5:
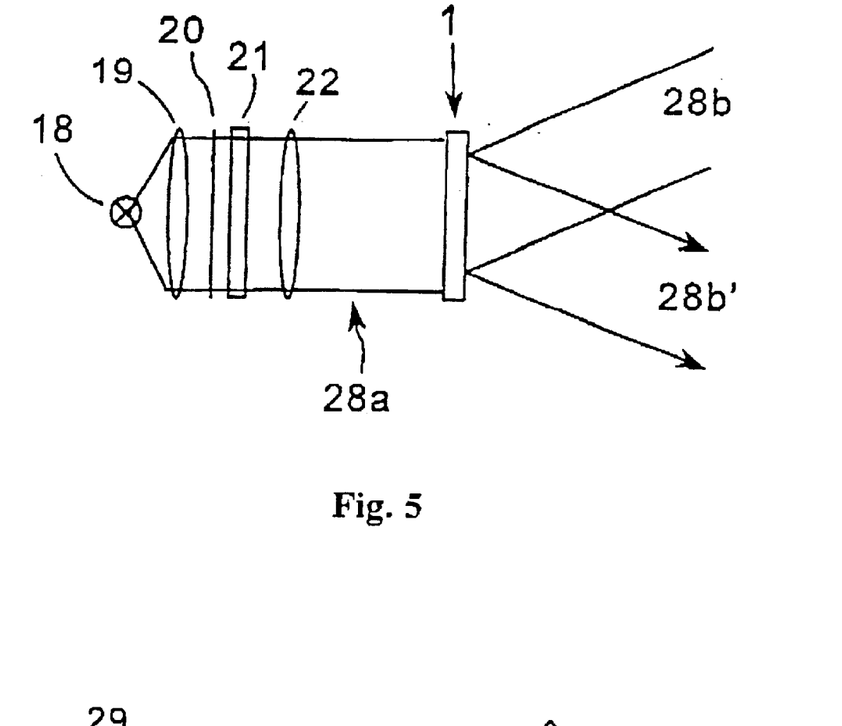
FIG. 5 shows the design of an embodiment of the light modulator which is advantageous for the application shown in FIG. 4.

FIG. 5 illustrates a possible application of an OASLM according to the invention, as illustrated in FIG. 4.

FIG. 5 shows a schematic illustration of an optical design which can be used as an incoherent/coherent converter. Located on the left-hand side of the OASLM 1 in FIG. 5 is the optical device 18–22 for generating an incoherent control light bundle 28a which carries the information to be transmitted by the mediation of the OASLM 1. In the example, this device 18–22 for generating the control light bundle 28a comprises a halogen lamp 18 as light source, a condenser 19, a color filter 20 which passes the desired control light wavelength, at object structure 21 and an imaging optical system 22. The control light bundle 28a therefore projects the information image of the object structure 21 onto the OASLM 1, in order to activate the photochromic layer 15a in accordance with this information image. The filter layer 14a of the OASLM 1, which filter layer is not illustrated in FIG. 5 but can be seen in FIG. 4, retroreflects the component of the control light 28a passed by the photochromic layer 15a, such that this control light component can contribute to the optical activation of the photochromic layer 15a during the second passage through the photochromic layer 15a. Moreover, the reflecting filter layer 14a ensures that the OASLM 1 does not pass, or in any event passes with strong attenuation, the control light into the spatial region of the signal light situated in FIG. 4 on the right-hand side of the OASLM 1. The object structure 21 can comprise, for example, a static mask or a dynamic mask, for example in the form of a liquid crystal display screen which is transirradiated by the control light bundle 28a, in order to modulate the object information onto the incoherent control light bundle 28a. The OASLM 1 is irradiated from the right-hand side of the OASLM 1 in FIG. 5 with non-modulated coherent light 28b (signal light), which is passed to the photochromic layer 15a by the reflecting filter layer 14a (FIG. 4) and is retroreflected after passing the photochromic layer 15a at the filter layer 14b, which reflects the signal light 28b in a wavelength-selective fashion. The reflected coherent signal light 28b' is modulated or loaded with the object information of the incoherent control light 28a.

The function of the OASLM 1 according to FIG. 4 is not limited to the incoherent/coherent conversion in the sense of the arrangement according to FIG. 5; it is also possible to use coherent and/or incoherent light on both sides of the OASLM 1. In each case, the photochromic BR layer is used to transmit the information from the control light beam path onto the signal light beam path.

In the case of the OASLM 1 according to FIG. 4, the light 28a previously denoted as control light can take over the function of the signal light, if the light 28b previously denoted as signal light takes over the function of the control light. Since it is therefore possible to drive the OASLM 1 according to FIG. 4 alternately-from the left-hand side and from the right-hand side with the aid of control light, in order to transmit the information contained in the control light via the OASLM 1 to the signal light on the respective other side, the OASLM-1 can be used as a bidirectional optical data transmission element or information transmission element.

The arrangement according to FIG. 5 can also be operated in principle with the aid of an OASLM 1 having the structure in accordance with FIG. 3, the incoherent light striking the BR layer 15 from the side of the substrate 13, whereas the coherent light to be modulated is irradiated from the opposite side. In this case, the mirror layer 14 would be a filter layer reflecting the coherent light (signal light). In the case of such an incoherent/coherent converter having a light modulator according to FIG. 3, however, interfering incoherent light would also possibly occur in the beam path of the coherent light. In order to prevent such a situation, it would be possible to operate using polarized incoherent light and to block out by means of polarization filters, for example, the incoherent light passed by the light modulator.

Figure 6:
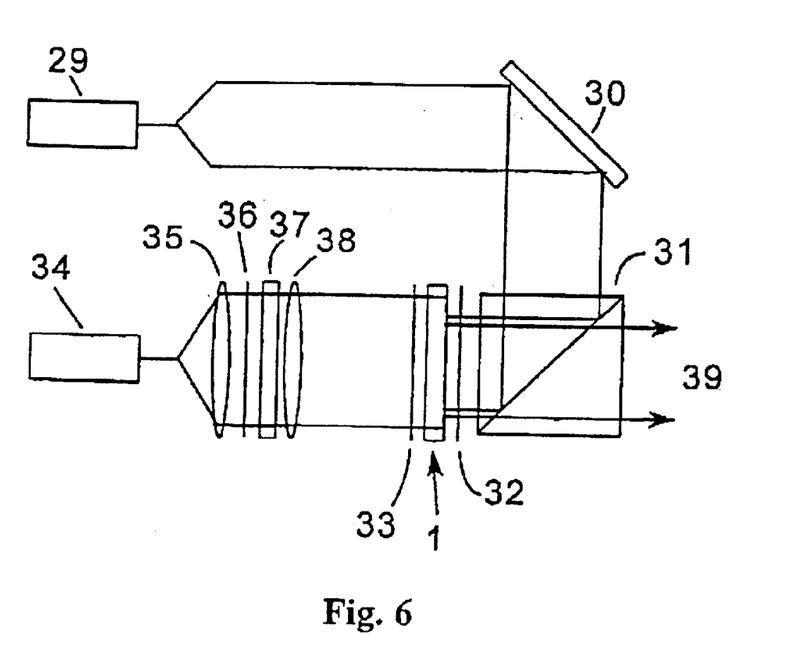
FIG. 6 shows the beam path of a frequency converter in which the light modulator serves as a coherent/coherent converter with the aid of which one wavelength can be controlled by another.

FIG. 6 illustrates a further possible application of the OASLM 1 according to FIG. 4. The OASLM 1 is illuminated by a first laser 34 with a beam which is expanded by means of lenses 35 and is modulated, in intensity, by a neutral density filter 36 and modulated by a static or variable mask 37 serving as object. The object information of the mask 37 is projected onto the OASLM 1 with the aid of the imaging optical system 38. In addition, a λ/4 plate 33 is provided which makes circularly polarized light from the linearly polarized light of the laser 34. The information impressed by means of the mask 37 is transmitted into the OASLM 1 by the control light emanating from the laser 34. The control light component penetrating the photochromic layer 15a is retroreflected at the wavelength-selectively reflecting filter layer 14a (FIG. 5).

Emanating from a second laser 29 is a second expanded beam (signal light beam) which is directed onto the OASLM 1 in unmodulated form via a mirror 30 and a polarizing beam splitter 31, specifically on the side of the OASLM 1 opposite the control light entry side. Before the modulated signal light beam strikes the OASLM 1, it passes the λ/4 plate 32. After retroreflection at the filter layer 14b reflecting the signal light in a wavelength-selective fashion (FIG. 5) the signal light beam has the direction of polarization which is perpendicular to the original direction of irradiation polarization, and will pass through the polarizing beam splitter. The emerging signal light beam 39 has the wavelength of the second laser 29, but carries the information of the object mask 37 transmitted with the control light into the OASLM. The optical arrangement according to FIG. 6 permits the information to be modulated from a first light beam of wavelength λ1 onto a second light beam of wavelength λ2. The term frequency converter is therefore used.

A particular advantage of the OASLM is yielded by the use of bacteriorhodopsin (BR). Owing to the efficient photochemistry of the BR, it is possible to implement a very quickly operating dynamic system in the case of which the information to be transmitted can vary in time in the millisecond range. In the case of an application of 568 nm and 413 nm for the control light and signal light, respectively, (or vice versa), a maximum amplitude modulation is achieved in simultaneous conjunction with high temporal dynamics of the OASLM, since writing and erasing can be implemented photochemically at any location.

What is claimed is:

1. A light modulator element for modulating signal light by means of laser radiation as control light which is to be fed to a control light entry side of the light modulator element, comprising a photochromic layer (15; 15a) which can be optically activated by the control light for the purpose of modulating signal light, and an optically transparent substrate (13; 13a) for the photochromic layer (15; 15a), characterized in that the light modulator element (1) has as further layer on the side of the photochromic layer (15; 15a) averted from the control light entry side a reflective filter layer (14; 14a) which is transparent to signal light but reflects the control light in a wavelength-selective fashion with a spectral bandwidth of at most 70 nm, in order to retroreflect into the photochromic layer (15; 15a) control light which has penetrated the photochromic layer (15; 15a), the reflective filter layer (14; 14a) having a reflectivity as regards the control light of at least 80%.

2. The light modulator as claimed in claim 1, in which the reflective filter layer (14; 14a) is arranged between the photochromic layer (15; 15a) and the substrate (13; 13a) and makes direct contact with the photochromic layer (15; 15a).

3. The light modulator as claimed in claim 1, in which the reflective filter layer (14; 14a) has a reflectivity of at least 99% as regards the control light.

4. The light modulator as claimed in claim 3, in which the reflective filter layer (14; 14a) has a reflectivity of at least 80%, in particular of at least 99%, in at least one further wavelength region in addition.

5. The light modulator as claimed in claim 1, in which the photochromic layer (15; 15a) contains bacteriorhodopsin.

6. The light modulator as claimed in claim 5, in which the photochromic layer (15; 15a) contains a variant of the wild form of the bacteriorhodopsin, which has a higher light sensitivity and/or a longer service life of the longest lived intermediates than the wild form, in particular a variant in the case of which the amino acid position 85 is modified, or a variant in the case of which the amino acid position 96 is modified, or a variant in the case of which dihydroretinal or 4-ketoretinal serves as chromophore group, or a variant in the case of which both dihydroretinal or 4-ketoretinal serve as chromophore group and the amino acid position 85 and/or 96 are modified.

7. The light modulator as claimed in claim 1, characterized in that a reflective filter layer (14b) which reflects the signal light in a wavelength-selective fashion is provided on the side of the photochromic layer (15a) averted from the reflective filter layer (14a), in order to retroreflect signal light which has penetrated the photochromic layer (15a).

8. An optical display device having a light modulator (1) as claimed in claim 1 as display element, a laser as control light source (5) for activating the photochromic layer (15) of the light modulator element (1) with the aid of control light in accordance with the information respectively to be displayed, and a signal light source (9) for providing the signal light which is to be modulated by the light modulator element (1) in order to visualize the information to be displayed, the light modulator element (1) being arranged in the control light beam path and in the signal light beam path in such a way that the control light and the signal light enter the photochromic layer (15) on the side of the photochromic layer (15) averted from the reflective filter layer (14), the modulated signal light being capable of emerging on the side of the light modulator element (1) opposite the light entry side.

9. The optical display device as claimed in claim 8, a deflecting device (11), in particular a biaxial scanner, being provided for the controlled deflection of the control light beam, and an intensity modulator (10) being provided which controls the intensity of the control light beam as a function of its impingement position on the photochromic layer (15) in accordance with the information to be displayed.

10. The optical display device as claimed in claim 9, in which the laser (9) can be switched over between two wavelengths $\lambda_S$ and $\lambda_L$ which are selected such that the photochromic layer (15) can be written with light of wavelength $\lambda_S$ and can be erased with light of wavelength $\lambda_L$.

11. An optical arrangement having a control light source (18; 34), a signal light source (29) and a light modulator element as claimed in claim 7 for the purpose of transmitting information contained in a control light beam onto a signal light beam, in which the control light beam carrying the respective information enters the photochromic layer (15a) from the side of the photochromic layer (15a) averted from the reflective filter layer (14a) reflecting the control light in a wavelength-selective fashion, and the signal light beam enters the photochromic layer (15a) from the side of the photochromic layer (15a) averted from the reflective filter layer (14b) reflecting the signal light in a wavelength-selective fashion.

12. The optical arrangement as claimed in claim 11, in which the control light (28a) is incoherent and the signal light (28b) is coherent.

13. The optical arrangement as claimed in claim 11, in which the control light source (34) is a laser with a wavelength $\lambda_1$, and the signal light source (29) is a laser with the wavelength $\lambda_2$.

* * * * *